United States Patent [19]
Tsutsui

[11] Patent Number: 5,150,356
[45] Date of Patent: Sep. 22, 1992

[54] DUAL-RING ATM COMMUNICATIONS SYSTEM

[75] Inventor: Takashi Tsutsui, Tokyo, Japan

[73] Assignee: NEC Corporation, Tokyo, Japan

[21] Appl. No.: 735,533

[22] Filed: Jul. 26, 1991

[30] Foreign Application Priority Data

Jul. 27, 1990 [JP] Japan .................................. 2-197631

[51] Int. Cl.⁵ ........................ H04J 3/14; H04L 12/42
[52] U.S. Cl. ................................ 370/16.1; 370/85.12; 371/11.2
[58] Field of Search ..................... 370/16, 16.1, 85.12, 370/85.15; 340/825.05; 371/11.1, 11.2

[56] References Cited

U.S. PATENT DOCUMENTS

| | | | |
|---|---|---|---|
| 4,530,085 | 7/1985 | Hamada et al. | 370/16 |
| 5,003,531 | 3/1991 | Farinholt et al. | 370/16.1 |
| 5,091,902 | 2/1992 | Chopping et al. | 370/16 |

*Primary Examiner*—Douglas W. Olms
*Assistant Examiner*—Min Jung
*Attorney, Agent, or Firm*—Foley & Lardner

[57] ABSTRACT

An ATM communications system has two ring transmission lines in which network nodes are connected for transmission of cells in opposite directions. Each cell contains a first identifier identifying one of the rings and a second identifier identifying a path between source and destination nodes. Each node comprises two subsystems one for each ring transmission lines. Each subsystem includes a multiplexer for forwarding a cell to a first segment of the associated ring and a cell detector for examining the identifiers of a cell from a second segment of the ring to determine its destination. A demultiplexer is normally connected to the second segment of the associated ring for terminating a cell received therefrom or passing it on to the multiplexer depending on the destination determined by the cell detector. A fault on the second segment of the associated ring is detected by a fault detector. In response to the detection of a fault by the fault detector, a connection is established from the multiplexer of the other subsystem to the demultiplexer of the own subsystem, and the latter is disconnected from the second segment of the associated ring.

2 Claims, 5 Drawing Sheets

DUAL-RING ATM COMMUNICATIONS SYSTEM

BACKGROUND OF THE INVENTION

The present invention relates generally to asynchronous transfer mode (ATM) communications systems, and more specifically to a lock control mechanism for a multiprocessor system.

It is known to transport ATM cells between source and destination nodes via intermediate node using two ring transmission lines, one for each direction of transmission. To ensure against possible cable failures, the transmission system is duplicated for each direction of transmission. On encountering a fault in the active line, the system is automatically switched to the spare line to minimize system downtime. However, this mode of transmission is not cost effective. It is also known to transport ATM cells on two ring transmission lines without duplicating the lines. In the event of a fault, the network node on each end of the faulty ring section establishes a folded connection so that source and destination nodes are interconnected by a single ring transmission line for each direction of transmission. However, for routing the cells through the reconfigured network it takes a substantial amount of time, thus resulting in a long recovery time.

SUMMARY OF THE INVENTION

It is therefore an object of the present invention to provide an ATM communications system which can be recovered from a transmission fault in a short period of time.

According to the present invention, the asynchronous transfer mode communications system of this invention comprises first and second ring transmission lines and a plurality of network nodes connected in the ring transmission lines so that cells are transmitted in one direction over the first ring transmission line and an opposite direction over the second ring transmission line. Each network node comprises a first multiplexer for forwarding a cell to a first segment of the first ring transmission line and a second multiplexer for forwarding a cell to a first segment of the second ring transmission line. Each of the cell contains a first identifier identifying one of the ring transmission lines and a second identifier identifying a path between source and destination nodes. A first cell detector is provided for examining the identifiers of a cell from a second segment of the first ring transmission line to determine the destination of the cell, and a second cell detector is provided for examining the identifiers of a cell from a second segment of the second ring transmission line to determine the destination of the cell. A first demultiplexer is normally connected to the second segment of the first ring transmission line for terminating a cell received therefrom or passing it on to the first multiplexer depending on the destination determined by the first cell detector, and a second demultiplexer is normally connected to the second segment of the second ring transmission line for terminating a cell received therefrom or passing it on to the second multiplexer depending on the destination determined by the second cell detector. A fault on the second segment of the first ring transmission line is detected by a first fault detector and a fault on the second segment of the second ring transmission line is detected by a second fault detector. In response to the detection of a fault by the first fault detector, a first emergency connection is established from the second multiplexer to the first demultiplexer and the latter is disconnected from the second segment of the first ring transmission line. Likewise, in response to the detection of a fault by the second fault detector, a second emergency connection is established from the first multiplexer to the second demultiplexer and the latter is disconnected from the second segment of the second ring transmission line.

By virtue of the first and second identifiers which are examined by the cell detectors, cells are automatically routed through emergency connections and transported as "transit" cells over ring transmission lines having different ring identifiers until they reach the destination. Since the header information is not required to be changed as the direction of cell transmission is altered on passing the emergency connections, the system is able to assume normal operation in a short recovery time, enhancing the reliability of the system.

BRIEF DESCRIPTION OF THE DRAWINGS

The present invention will be described in further detail with reference to the accompanying drawings, in which.

DETAILED DESCRIPTION

Figure 1:
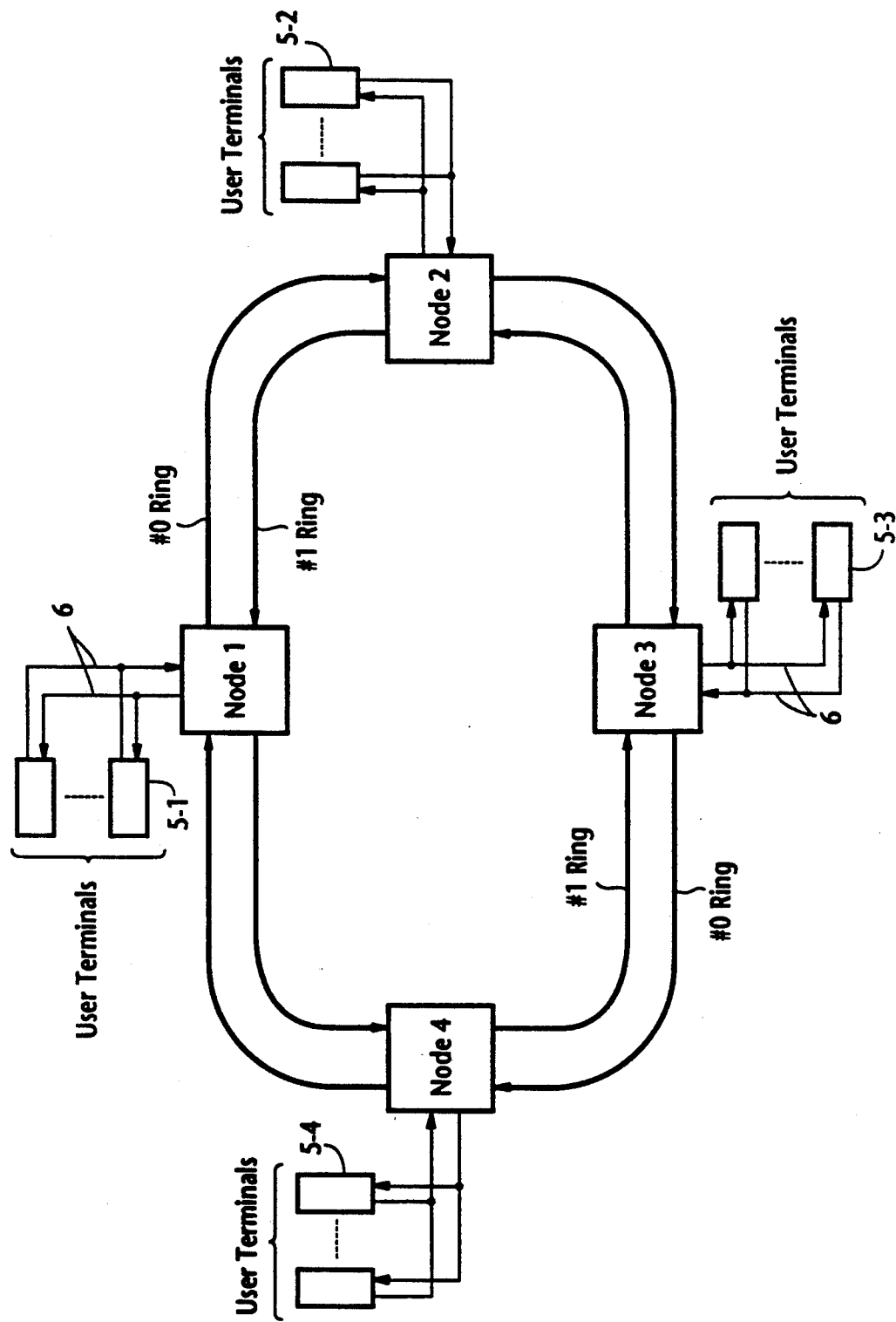
FIG. 1 is a block diagram of a dual-ring ATM communications system according to the present invention.

Referring now to FIG. 1, there is shown an asynchronous transfer mode communications system according to the present invention. The system comprises a plurality of switching nodes 1, 2, 3 and 4 interconnected by segments of transmission mediums, or rings #0 and #1 having opposite directions of transmission. Each switching node serves one or more user terminals 5 connected by ring access lines 6. Each user sends a signal in the form of a packet, or "cell" containing a header indicating which of the rings the user terminal is permanently associated.

Figure 2:
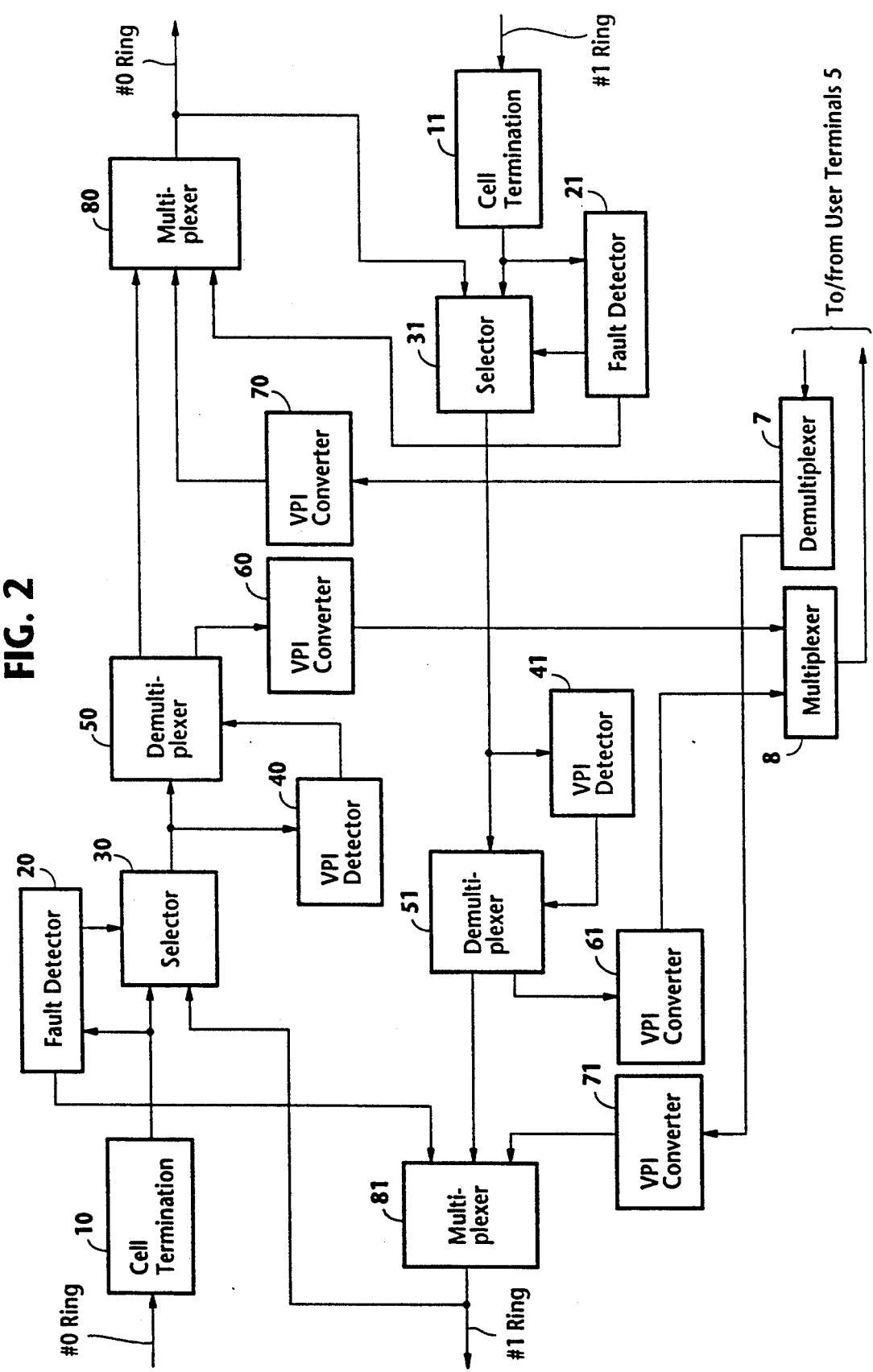
FIG. 2 is a block diagram of each switching node of the system.

As shown in detail in FIG. 2, each switching node comprises two subsystems for rings #0 and #1, respectively. Incoming cells from user terminals are received by a demultiplexer 7 in which the header of each cell is examined to determine which one of the rings the cell is to be forwarded. Cells terminating to each switching node are multiplexed by a multiplexer 8 into a single data stream for transmission to the associated user terminals.

The subsystem for ring #0 comprises a cell termination circuit 10 to which the incoming end of a segment of ring #0 is connected. Cell termination circuit 10 provides synchronization of incoming ATM packets, called "cells" and error correction on the header of each cell. A fault detector 20 is connected to the output of cell termination circuit 10 to detect a faulty condition that occurs on the incoming ring #0 by examining the output of cell termination circuit 10 and generates a route switching signal when an out-of-sync condition occurs or a fault indication signal is received from an adjacent switching node. Fault detector 20 generates a fault indication signal in response to the detection of an out-of-sync condition and applies it to a multiplexer 81 of the subsystem for ring #1 to inform the emergency condition of ring #0 to an adjacent node. A selector 30 is provided having a first input port coupled to the output of cell termination circuit 10 and a second input port coupled to the output of the subsystem for ring #1. Selector 30 normally couples the first input port to its output port and responds to the route switching signal from fault detector 20 by coupling the output of multiplexer 81 to its output port, instead of the output of cell termination circuit 10. This switching operation establishes a folded, emergency connection between rings #0 and #1 on one side of the switching node.

The output port of selector 30 is connected to a VPI (virtual path identifier) detector 40 which examines the VPI field of an incoming cell it receives from the selector 30 and applies a control signal to a demultiplexer 50 to cause it to divert the incoming cell to a VPI converter 60 or a multiplexer 80. VPI converter 60 provides conversion of the VPI field of the terminating cell from demultiplexer 50 into the format of the ring access lines and transmits it through multiplexer 8 to a destination user terminal. An outgoing cell from a user terminal to which ring #0 is assigned is detected by demultiplexer 7 and applied to a VPI converter 70 in which the VPI format of the cell is converted to a form suitable for ring transmission. Multiplexer 80 combines the output of VPI converter 70 with transit ("through traffic") cells supplied from demultiplexer 50 into an outgoing data stream and forwards it onto the outgoing end of a segment of ring #0.

The subsystem for ring #1 is similar to that for ring #0. It comprises a cell termination circuit 11 to which the incoming end of a segment of ring #1 is connected. Cell termination circuit 11 provides synchronization of incoming cells and error correction on the header of each cell and applies the cell to a fault detector 21 and to a selector 31. Selector 31 has a first input port coupled to the output of cell termination circuit 11 and a second input port coupled to the output of multiplexer 80 of the subsystem for ring #0. Selector 31 normally couples the first input port to its output port and responds to a route switching signal from fault detector 21 by coupling the second input port to the output port. This establishes a folded, emergency connection between rings #0 and #1 on the other side of the switching node. Similar to fault detector 20, fault detector 21 applies a fault indication signal to multiplexer 80 in response to the detection of an out-of-sync condition that occurs on ring #1 to inform its emergency condition to an adjacent node.

The output port of selector 31 is connected to a VPI (virtual path identifier) detector 41 which examines the VPI contained in the cell from selector 31 and applies a switching signal to a demultiplexer 51 in which the cell from selector 31 is separated for coupling to a VPI converter 61 or multiplexer 81 depending on the switching signal. VPI converter 61 translates the VPI field of an incoming cell on ring #1 into the format of ring access lines for transmission to a destination user terminal through multiplexer 8 in which it is combined with the output of VPI converter 60. An outgoing cell from a user terminal to which ring #1 is assigned is separated by demultiplexer 7 for coupling to a VPI converter 71 in which its VPI format is converted to a form suitable for ring transmission. Multiplexer 81 combines the output of VPI converter 71 with transit cells from demultiplexer 51 into an outgoing data stream and forwards it onto the outgoing end of a segment of ring #1.

The VPI field of each cell contains a ring identifier ($R_k$) identifying which ring (k=0 or 1) is to be used for cell transmission and a path identifier ($P_{i,j}$) indicating a virtual path between a source switching node (i) and a destination switching node (j).

Figure 3A:
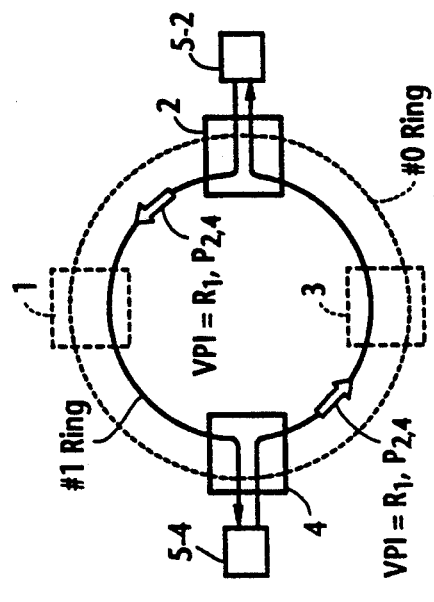
FIGS. 3a to 3d are schematic views showing different modes of transmission.
Figure 3B:
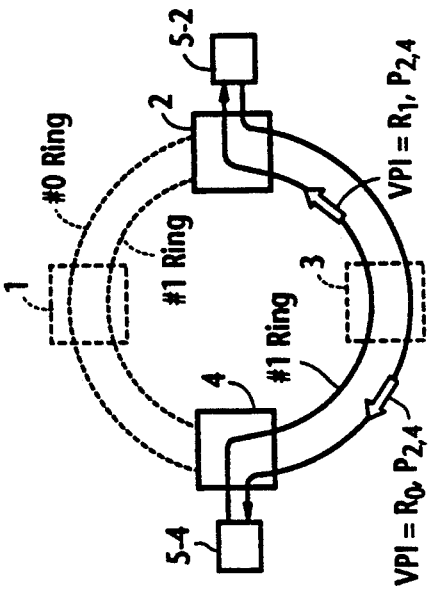
Figure 3C:
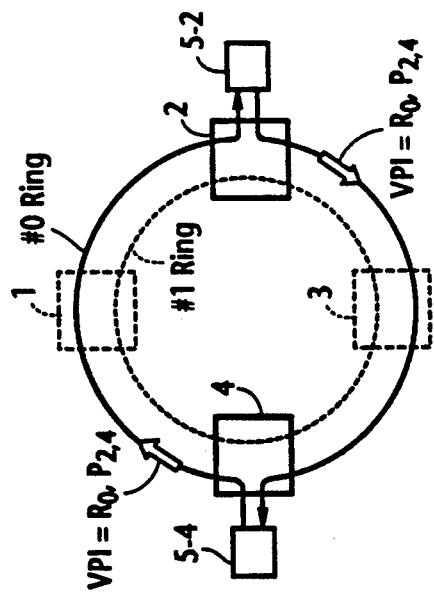
Figure 3D:
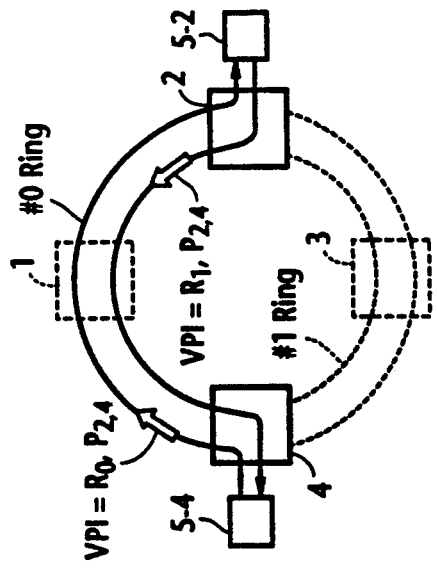

Between any two switching nodes a full-duplex path can be established in one of four possible ways. Assume that a path is established between node 2 and node 4. If each of nodes 2 and 4 sends a cell containing a $VPI=R_0$, $P_{2,4}$, a path is established on ring #0 as shown in FIG. 3a. If nodes 2 and 4 both transmit a cell containing a $VPI=R_1$, $P_{2,4}$, a path is established on ring #1 as shown in FIG. 3b. If nodes 2 and 4 transmit a $VPI=R_1$, $P_{2,4}$ and a $VPI=R_0$, $P_{2,4}$, respectively, a full-duplex path is established on upper half sections of rings #0 and #1 as shown in FIG. 3c. Likewise, if nodes 2 and 4 transmit a $VPI=R_0$, $P_{2,4}$ and a $VPI=R_1$, $P_{2,4}$, respectively, a path is established on lower half sections of rings #0 and #1 as shown in FIG. 3d.

The operation of the dual-ring communications system of this invention will be described in detail below with reference to FIG. 4a in which parts corresponding to those in FIG. 2 are marked with a numeral appended with a subscript denoting the node. It is assumed that user terminals 5-2 (node 2) and 5-4 (node 4) are assigned rings #0 and #1 to establish a connection therebetween in the same manner as shown in FIG. 3a, so that the upper half section of ring #0 is used for transmission of cells from node 4 to node 2 and the lower half section of the same ring for transmission of cells from node 2 to node 4.

Cells transmitted from user terminal 5-2 are received by the demultiplexer $7_2$ in which the VPI field of the cells is examined. The VPI field contains source/destination identifiers in a format that is defined on the ring access line 6. The cells are diverted by demultiplexer $7_2$ to VPI converter $70_2$ in which the VPI field is converted to $R_0$, $P_{2,4}$ so that it conforms to the format of the ring transmission lines #0 and #1. Multiplexer $80_2$ forwards the cells from VPI converter $70_2$ onto a section of ring #0 that extends to adjacent switching node 3.

On receiving a cell from node 2, the cell termination circuit $10_3$ of node 3 provides synchronization on the received cell and passes it via selector $30_3$ to VPI detector $40_3$. Since the path identifier mismatches the identifier of the own node, detector $40_3$ determines that the cell is a transit cell and causes demultiplexer $50_3$ to pass it on through multiplexer $80_3$ to a section of ring #0 that extends to destination node 4.

On receiving a cell from node 3, the cell termination circuit $10_4$ provides synchronization on the received cell and passes it via selector $30_4$ to VPI detector $40_4$. As the path identifier matches the identifier of node 4, detector $40_4$ determines that the cell is destined to the own node and causes demultiplexer $50_4$ to divert it to VPI converter $60_4$ in which the VPI format is converted to the format of the ring access line and the cell is forwarded through multiplexer $8_4$ to the user terminal 5-4.

In a manner similar to that described above, outgoing cells from user terminal 5-4 are passed through demultiplexer $7_4$ and VPI converter $70_4$ and passed through intermediate node 1 over the upper half section of ring #0 and arrive at node 2 in which they are passed through VPI converter $60_2$ and multiplexer $8_2$ to user terminal 5-2.

Figure 4A:
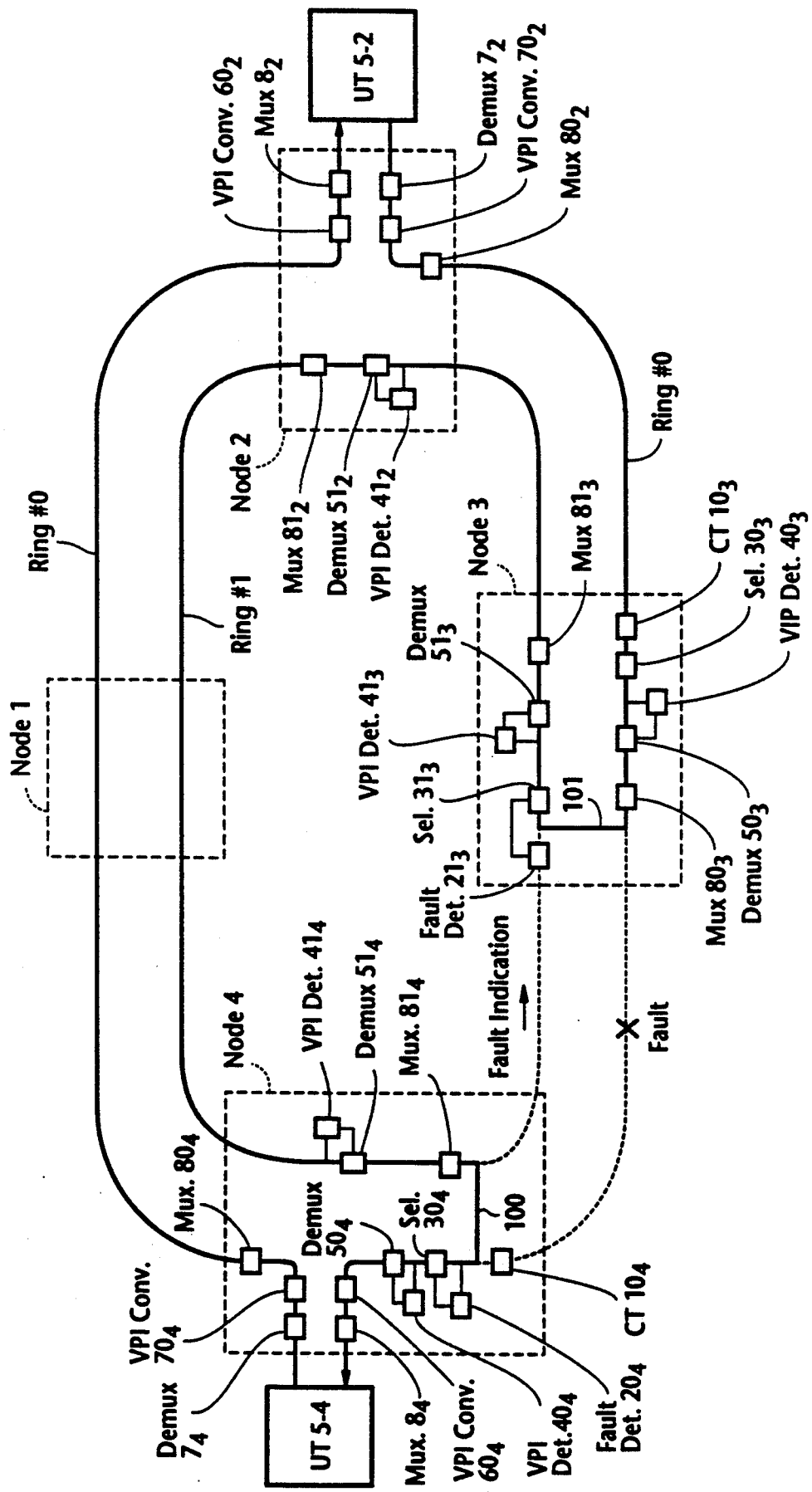
FIG. 4a is a schematic view showing details of transmission routes in the event of a fault that occurs in the mode FIG. 3a and FIG. 4b is a view showing transmission routes if a fault occurs in the mode FIG. 3d.

If a fault occurs on ring #0 between nodes 3 and 4 as marked "X" in FIG. 4a, fault detector $20_4$ detects an out-of-sync condition and causes selector $30_4$ to couple the output of multiplexer $81_4$ to selector $30_4$, causing a folded connection 100 to be established from the output of multiplexer $81_4$ to the input of demultiplexer $50_4$. At the same time, fault detector $20_4$ applies a fault indication signal to multiplexer $81_4$, which forwards it onto ring #1 to node 3. In node 3, this fault indication signal is received by fault detector $21_3$ and a route switching signal is supplied from it to selector $31_3$ to establish a folded connection 101 from the output of multiplexer $80_3$ to the input of demultiplexer $50_3$.

An outgoing cell (VPI=$R_0$, $P_{2,4}$) from user terminal 5-2 is sent from node 2 and sensed by VPI detector $40_3$ as a transit cell as its node identifier mismatches that of node 3 and is returned through connection 101 to VPI detector $41_3$ where it is sensed as a transit cell and forwarded onto ring #1 to node 2. Since the ring identifier of the cell mismatches that of VPI detector $41_2$, it is passed on through demultiplexer $51_2$ and multiplexer $81_2$ to node 1, where it is treated again as a transit cell and passed on to node 4. On arriving at node 4, the cell is first treated as a transit cell by VPI detector $41_4$ and passed through demultiplexer $51_4$, multiplexer $81_4$ and connection 100 to VPI detector $40_4$. Since both identifiers of the cell match the corresponding identifiers of node 4, VPI detector $40_4$ senses it as being destined to the own node and causes demultiplexer $50_4$ to divert it to VPI converter $60_4$ and thence to user terminal 5-4. On the other hand, the route of transmission for cells from user terminal 5-4 is not affected by the occurrence of the fault.

Figure 4B:
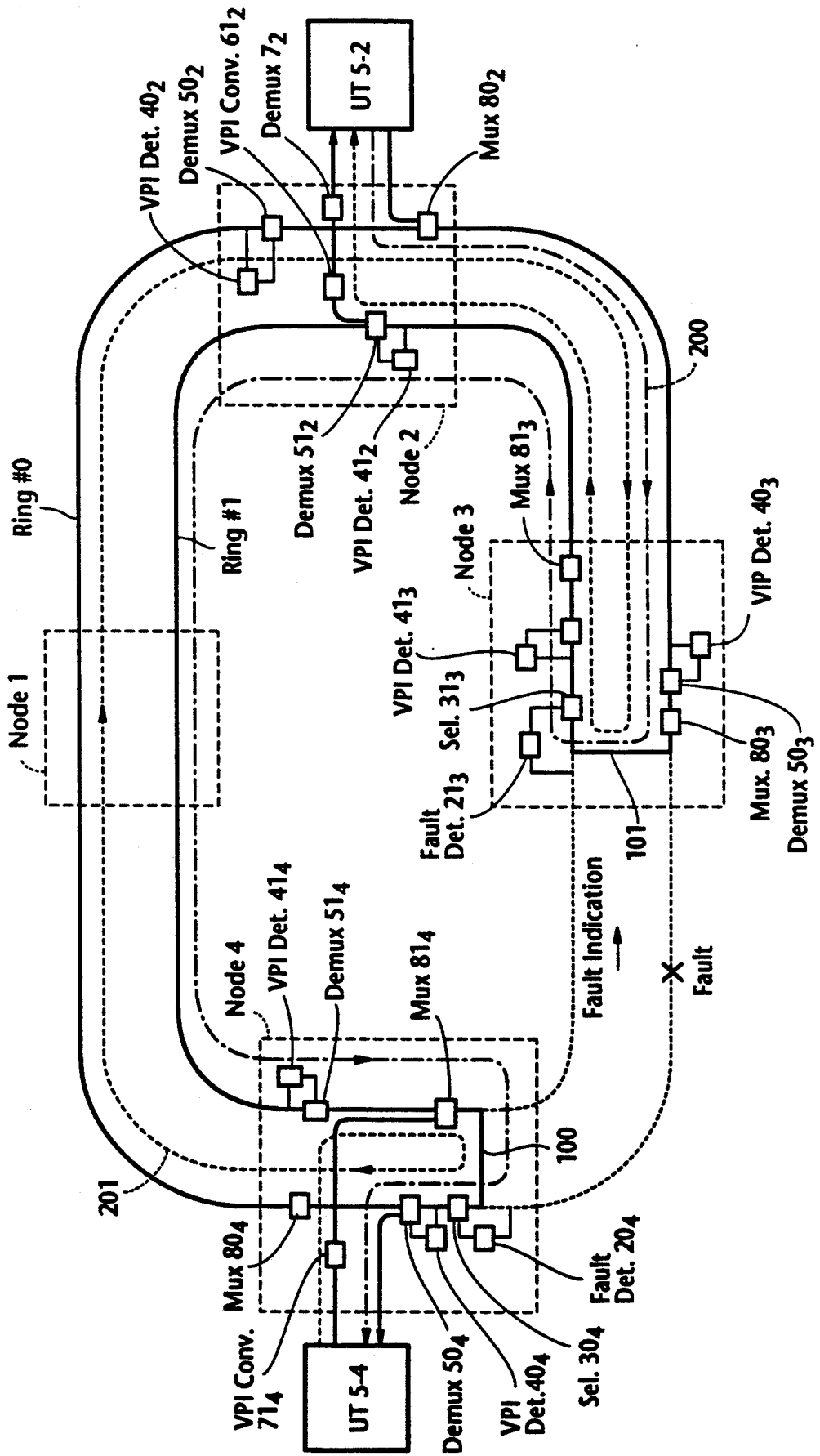

The operation of this invention will be further described below with reference to FIG. 4b in which it is assumed that a connection is established between user terminals 5-2 and 5-4 in the same manner as shown in FIG. 3d, and a fault occurs on ring #0 between nodes 3 and 4 as in FIG. 4a.

Prior to the occurrence of the fault, the lower half section of ring #0 is used for transmission of cells from node 2 to node 4 and the lower half section of ring #1 is used for transmission of cells from node 4 to node 2. When the fault occurs at a point marked "X" in FIG. 4b, folded connections 100 and 101 are established in the same manner as described above.

As in FIG. 4a, an outgoing cell carrying VPI=$R_0$, $P_{2,4}$ from user terminal 5-2 is sent on a route indicated by a chain-dot line 200 from node 2 to node 3 where it is sensed by VPI detector $40_3$ as a transit cell and returned through connection 101, sensed again by VPI detector $41_3$ as a transit cell and is forwarded onto ring #1 to node 2, in which its ring identifier is detected by VPI detector $41_2$ as a mismatch and the cell is passed on to node 1, where it is treated again as a transit cell and passed on to node 4. On arriving at node 4, the cell is first treated as a transit cell by VPI detector $41_4$ and then passed on through demultiplexer $51_4$, multiplexer $81_4$ and connection 100 to VPI detector $40_4$ and passed through demultiplexer $50_4$ to VPI converter $60_4$ and thence to user terminal 5-4.

On the other hand, an outgoing cell carrying VPI=$R_1$, $P_{2,4}$ from user terminal 5-4 moves along a route indicated by a dashed line 201. At node 4, the cell is applied first to VPI converter $71_4$ and thence to multiplexer $81_4$ and passed through connection 100 to VPI detector $40_4$ where it is sensed as a transit cell and forwarded through multiplexer $80_4$ onto ring #0 to node 1 in which it is treated as a transit cell and passed to destination node 2. Since the ring identifier of the cell is different from that of VPI detector $40_2$, it is treated again as a transit cell and passed on through demultiplexer $50_2$ and multiplexer $80_2$ to node 3. At node 3, it is treated again as a transit cell and returned through connection 101 to ring #0 on which it continues to move on to node 2. At the destination node 2, the VPI identifiers of the cell match those of VPI detector $41_2$, demultiplexer $51_2$ diverts it to user terminal 5-2 through VPI converter $61_2$ and demultiplexer $7_2$.

It is seen therefore that a VPI field having a ring identifier and a node identifier causes cells to be automatically routed through folded connections and transported over rings having different ring identifiers to a desired destination. Since the header information is not required to be changed as the direction of cell transmision is altered on moving past a folded connection, the system is able to assume normal operation in a short recovery time, enhancing the reliability of the system.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An asynchronous transfer mode communications system, comprising:

first and second ring transmission lines; and
a plurality of network nodes connected in the first and second ring transmission lines so that cells are transmitted in one direction over the first ring transmission line and an opposite direction over the second ring transmission line, each of the nodes comprising:
first multiplexer means for forwarding a cell to a first segment of the first ring transmission line and second multiplexer means for forwarding a cell to a first segment of the second ring transmission line, each of the cells forwarded by the first and second multiplexer means containing a first identifier ($R_k$) identifying one of the ring transmission lines and a second identifier ($P_{i,j}$) identifying a path between source and destination nodes;
first cell detector means for examining the identifiers of a cell from a second segment of the first ring transmision line to determine the destination of the cell;
second cell detector means for examining the identifiers of a cell from a second segment of the second ring transmission line to determine the destination of the cell;
first demultiplexer means normally connected to the second segment of the first ring transmission line for terminating the cell therefrom or passing it on to the first multiplexer means depending on the destination determined by the first cell detector means;
second demultiplexer means normally connected to the second segment of the second ring transmission line for terminating the cell therefrom or passing it on to the second multiplexer means depending on the destination determined by the second cell detector means;

first fault detector means for detecting a fault on the second segment of the first ring transmission line;

second fault detector means for detecting a fault on the second segment of the second ring transmission line;

first switching means for establishing a first emergency connection from the second multiplexer means to the first demultiplexer means in response to the detection of a fault by the first fault detectors means and disconnecting the first demultiplexer means from the second segment of the first ring transmission line; and second switching means for establishing a second emergency connection from the first multiplexer means to the second demultiplexer means in response to the detection of a fault by the second fault detector means and disconnecting the second demultiplexer means from the second segment of the second ring transmission line.

2. A communications system as claimed in claim 1, wherein the first fault detector means applies a fault indication signal to the second multiplexer means in the event of a fault on the second segment of the first ring transmission line, and the second fault detector means applies a fault indication signal to the first multiplexer means in the event of a fault on the second segment of the second ring transmission line, and wherein the first and second fault detector means (20, 21) are responsive to a fault indication signal from an adjacent node for establishing the first and second emergency connections, respectively, and disconnecting the first and second demultiplexer means from the second segments of the first and second ring transmission lines, respectively.

* * * * *